United States Patent [19]
Oike

[11] Patent Number: 5,855,189
[45] Date of Patent: Jan. 5, 1999

[54] EXHAUST CONTROLLER FOR INTERNAL COMBUSTION ENGINE

[75] Inventor: Ikuo Oike, Saitama, Japan

[73] Assignee: Honda Giken Kogyo Kabushiki Kaisha, Tokyo, Japan

[21] Appl. No.: 887,134

[22] Filed: Jul. 2, 1997

[30] Foreign Application Priority Data

Jul. 2, 1996 [JP] Japan .................................. 8-172520

[51] Int. Cl.⁶ ................................................ F02B 75/02
[52] U.S. Cl. ..................................... 123/65 PE; 123/323
[58] Field of Search ............................. 123/323, 65 PE, 123/65 V, 65 P

[56] References Cited

U.S. PATENT DOCUMENTS

| | | | |
|---|---|---|---|
| 4,672,925 | 6/1987 | Miyata et al. ....................... | 123/65 PE |
| 4,776,305 | 10/1988 | Oike ........................................ | 123/323 |
| 4,920,932 | 5/1990 | Schlunke .............................. | 123/65 PE |
| 4,969,329 | 11/1990 | Bolton et al. ........................ | 123/65 PE |
| 4,993,373 | 2/1991 | Klomp et al. ............................. | 123/323 |
| 5,063,887 | 11/1991 | Ozawa et al. ......................... | 123/65 PE |
| 5,063,888 | 11/1991 | Ozawa et al. .......................... | 123/73 C |
| 5,190,006 | 3/1993 | Motoyama et al. ................. | 123/65 PE |
| 5,367,998 | 11/1994 | Shiohara et al. ..................... | 123/65 PE |
| 5,373,816 | 12/1994 | Asai et al. ............................. | 123/323 |

*Primary Examiner*—David A. Okonsky
*Attorney, Agent, or Firm*—Birch, Stewart, Kolasch & Birch, LLP

[57] ABSTRACT

An exhaust controller includes an exhaust control valve. The exhaust controller is capable of adjusting an exhaust timing of a spark ignition type, two stroke internal combustion engine depending upon the rotational speed of the engine. The exhaust control valve has a structure and operation which greatly reduces exhaust leakage past the exhaust control valve. As a result, the scavenging efficiency and the charging efficiency are improved and the compression ratio of the engine is better maintained. In operation, the exhaust control valve maintains a relatively consistent cross-section throughout the exhaust gas flow passage. As a result, exhaust pressure is decreased, resulting in an increase in the output and efficiency of the engine.

18 Claims, 18 Drawing Sheets

EXHAUST CONTROLLER FOR INTERNAL COMBUSTION ENGINE

BACKGROUND OF THE INVENTION

1. Field of the Invention

The present invention relates to an exhaust controller for a spark ignition type, two stroke internal combustion engine. The exhaust controller is capable of adjusting an exhaust timing of the engine depending upon the rotational speed of the engine. Particularly, the present invention relates to an exhaust control valve for the exhaust controller having an improved structure and operation which greatly reduces exhaust leakage past the exhaust control valve.

2. Description of the Background Art

Spark ignition type, two stroke internal combustion engines having an exhaust controller are known in the art. For example, Japanese Patent Publication No. Sho 56-54336 and Japanese Patent Laid-open No. Hei 3-33426 show engines including: an exhaust port and a scavenging port which open into a cylinder hole. The ports are opened and closed by a reciprocating motion of a piston in the cylinder hole. In operation, new gas (unburnt gas) is precompressed in a crank chamber, then fed into the cylinder hole through a scavenging passage and the scavenging port. The new gas is then compressed in the cylinder hole, and ignited by an ignition plug. The burnt gas is exhausted via the exhaust port into an exhaust passage. An exhaust control valve is provided in the exhaust port for reducing the blowoff of the new gas. The exhaust control valve blocks an upper portion of the exhaust port during a low speed rotational state of the engine, and fully opens the exhaust port during a high speed rotational state of the engine.

The internal combustion engine described in Japanese Patent Publication No. Sho 56-54336 uses an exhaust control valve having a form of a double enveloping body. Part of the double enveloping body is cut out in a shape corresponding to a transverse cross-sectional shape of an upper portion of the exhaust passage. In operation, the exhaust valve can be brought into contact with the cylinder hole. For example, during the low speed operational state of the engine, the valve is positioned to partially block the exhaust port (see FIG. 1 of Japanese Patent Publication No. Sho 56-54336). However, due to the structure of the exhaust control valve, when the exhaust control valve is brought into contact with the cylinder hole, exhaust gas tends to leak, with relatively low resistance, through a gap formed between an outer peripheral wall of the piston and an outer peripheral surface of the exhaust control valve. This leakage reduces the exhaust control ability of the exhaust controller during the low speed operational state of the engine.

In the internal combustion engine shown in FIGS. 2 to 4 of Japanese Patent Laid-open No. Hei 3-33426, and as shown in FIGS. 29 to 31 in this specification, an exhaust control valve 01 includes a flat main body 02, a flexible thin plate-like blocking member 03 raised upright from a leading end of the flat main body 02, and an arcuate edge portion 04 of the flat main body 02 extending to a cylinder hole 05. The edge portion 04 conforms to the cylinder hole 05 with a narrow gap kept therebetween.

As shown in FIG. 31, a base portion of the flat main body 02 is pivotably supported about a shaft 07. The shaft is located in an approximately vertical center portion of the exhaust passage 06. A cavity portion 09 is formed in the cylinder block 08. As the flexible thin plate-like blocking member 03 rocks about the shaft 07, it is accepted into the cavity portion 09. In operation, the flexible thin plate-like blocking member 03 is vertically rocked depending on the rotating speed of the engine.

Such a configuration has several shortcomings. One shortcoming occurs when the exhaust control valve 01 is rocked downward in the low speed rotational state of the engine. When the upper edge of a piston 010 is moved up over the upper edge of an exhaust port 011, a gas in the cylinder hole 05 is trapped in a space defined by a cutout portion 012 of the cylinder block 08, blocking member 03, arcuate edge portion 04, and the outer peripheral surface of the piston 010. As a result, the scavenging efficiency and the charging efficiency are reduced and the compression ratio is lowered.

Further, since the exhaust passage 013 is formed in a rectangular shape in cross-section and the base portion of the flat main body 02 is positioned at the approximately vertical center of the exhaust passage 013, the cross-section of the exhaust gas flow passage is rapidly varied. This variance causes a large disturbance in the exhaust flow and thereby increases the exhaust pressure, resulting in a decrease in the output and the efficiency of the engine.

Further, residual solid matter contained in the exhaust gas tends to accumulate in the narrow width of the cavity portion 09. This residual solid matter can obstruct the sliding motion of the flexible thin plate-like blocking member 03 as it curvedly slides within the cavity portion 09.

SUMMARY OF THE INVENTION

Accordingly, it is the primary object of the present invention to provide an improved exhaust controller for a spark ignition type, two stroke internal combustion engine solving in the above mentioned shortcomings of the prior art.

It is another object of the present invention to provide an exhaust control valve which is simple in structure and shape, and easy to manufacture.

It is yet another object of the present invention to provide an exhaust control valve having a structure enabling in a simple operation of exhaust control valve, resulting in a reduced chance of failure due to accumulations of residual solid matter in the exhaust passage.

These and other objects of the present invention are fulfilled by providing an exhaust controller for an engine having a cylinder hole, an exhaust port communicating with said cylinder hole, and an exhaust passage leading away from said exhaust port, said exhaust controller comprising: an exhaust control valve mounted in the exhaust passage adjacent the exhaust port, and capable of reciprocating movement relative to the exhaust port, which movement results in varying degrees of blockage of said exhaust port's communication with the cylinder hole; wherein said exhaust control valve includes: a bottom surface portion having a lead edge, two side edges, and a back edge; said lead edge being located nearer to said cylinder hole than said two side edges and said back edge; and a control surface portion extending from said lead edge, said control surface portion facing the cylinder hole, said control surface portion having a curved shape with a radius of curvature substantially equal to a constant radius of curvature of the cylinder hole.

With this configuration, regardless of whether the exhaust control valve is in a closed or an open state, exhaust gas in the cylinder block is allowed to smoothly flow from the exhaust port into the exhaust passage without any trapping along the way. When the exhaust control valve is closed, the gas leakage from the cylinder hole into the exhaust passage is prevented by the protrusion portions protruded from both sides of the control surface portion of the exhaust control valve. This increases the scavenging efficiency and the charging efficiency, thereby improving the output and efficiency of the engine.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION ON THE PREFERRED EMBODIMENTS

Figure 1:
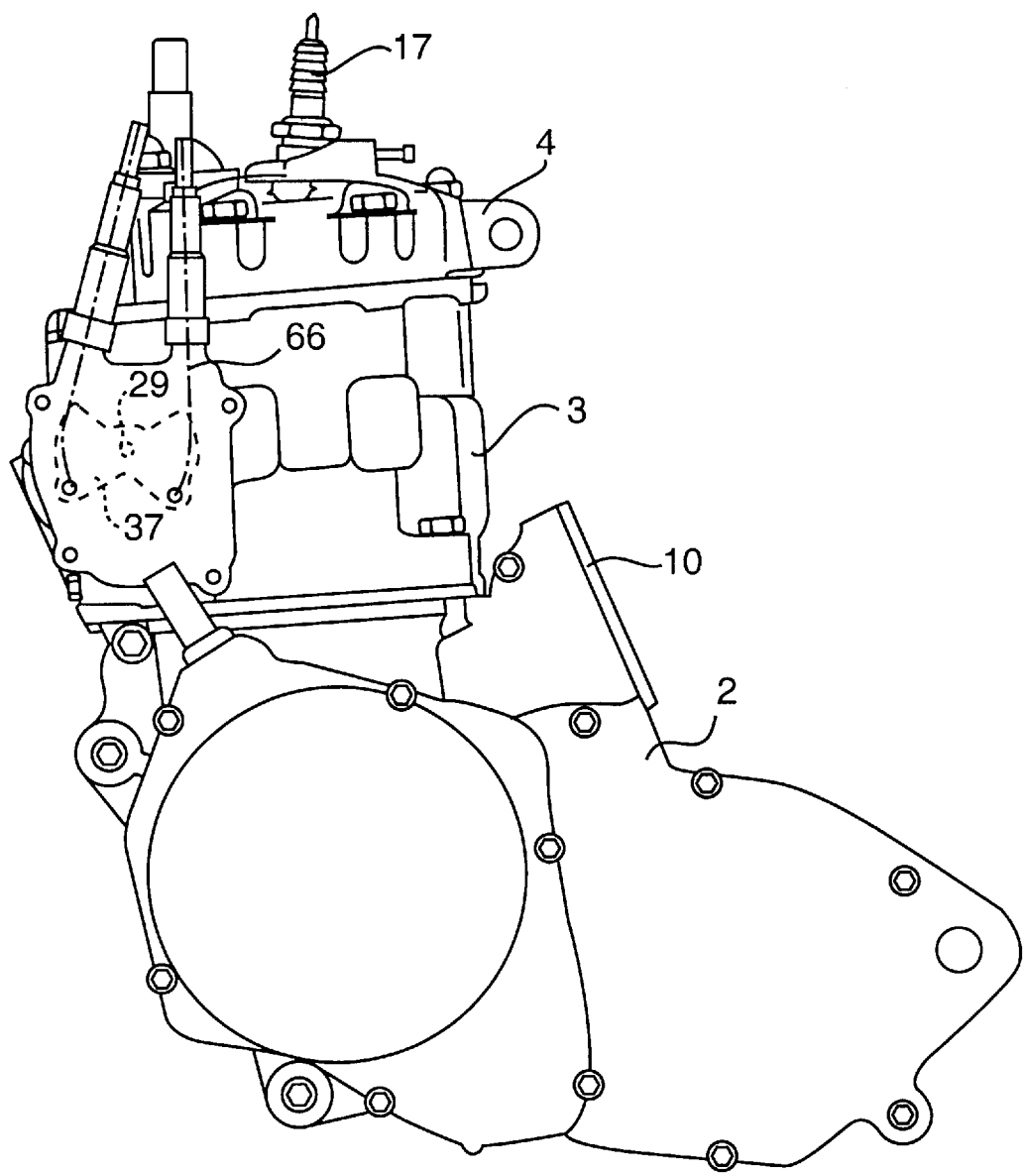
FIG. 1 is a side view of a spark ignition type, two stroke internal combustion engine including an exhaust controller of the present invention.
Figure 2:
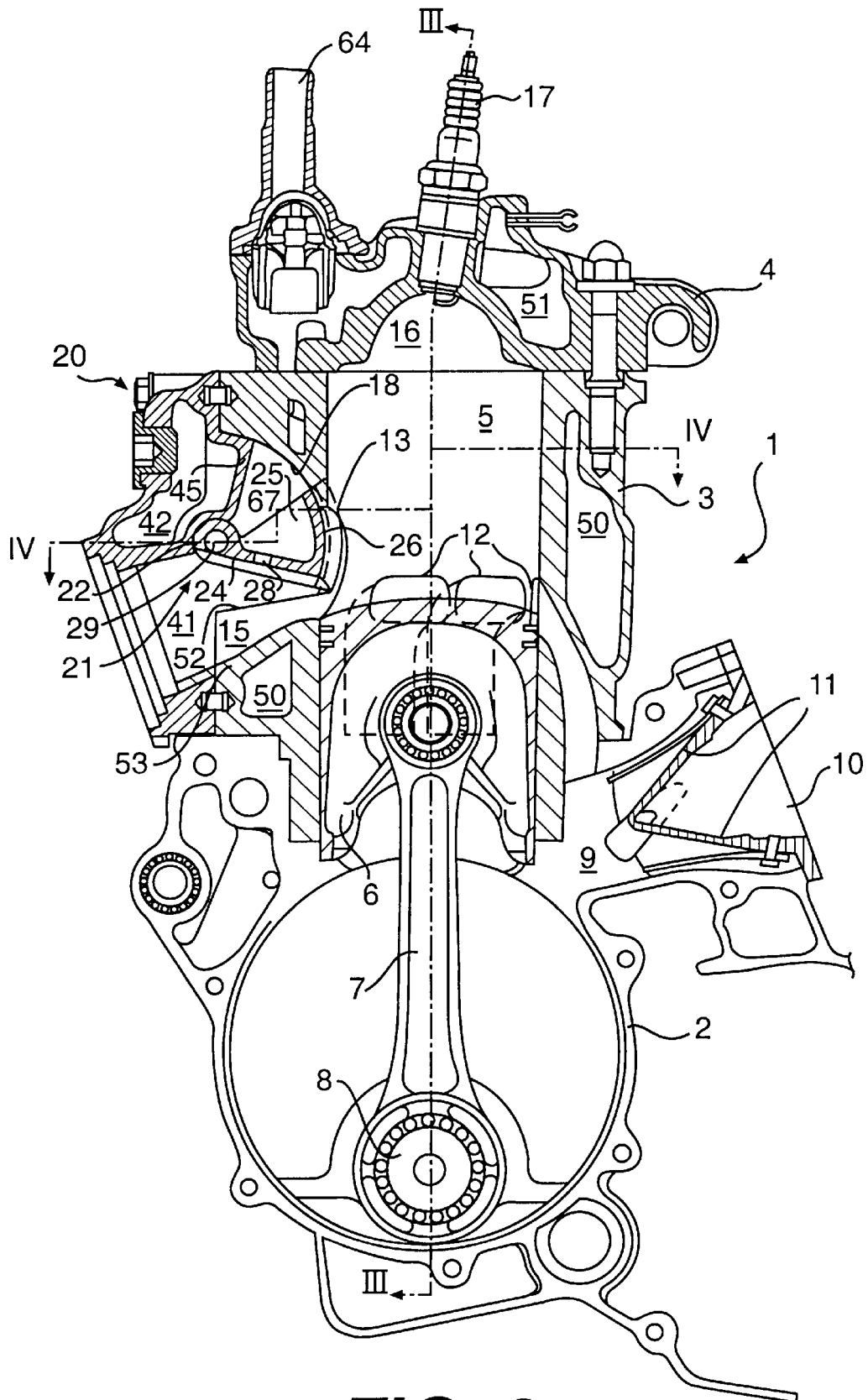
FIG. 2 is a cross-sectional view of FIG. 1, showing a state in which the exhaust control valve is rocked downward.

One embodiment of the present invention will be described below with reference to FIGS. 1 to 23.

A spark ignition type, two stroke internal combustion engine 1 including an exhaust control valve of the present invention is a single cylinder internal combustion (or multi-cylinder internal combustion engine) in which a cylinder block 3 is mounted on a motorcycle (not shown) in a posture raised upward. In this engine 1, the cylinder block 3 and a cylinder head 4 are sequentially stacked over a crank case 2 and integrally connected to each other.

A piston 6 is vertically slidably fitted in a cylinder hole 5 formed in the cylinder block 3, and the piston 6 is connected to a crank shaft 8 by a connecting rod 7. The crank shaft 8 is rotated by vertical movement of the piston 6.

An intake passage 10 communicated to a crank chamber 9 is formed in the crank case 2 at a position behind the cylinder block 3. A reed valve 11 is interposed in the intake passage 10, and a carburetor (not shown) is interposed in the intake passage 10 on the upstream side from the reed valve 11. Scavenging ports 12 are opened in an inner peripheral surface of the cylinder hole 5, and an exhaust port 13 is opened in the inner peripheral surface of the cylinder hole 5 over the scavenging ports 12 at a position opposed to the intake passage 10. The scavenging ports 12 are communicated to the crank chamber 9 via scavenging passages 14 formed in the cylinder block 3. The exhaust port 13 is communicated to a main exhaust passage 15 formed in the cylinder block 3, and the main exhaust passage 15 extends to an opening on a front side of the cylinder block 3. An ignition plug 17 is provided in a recessed portion of a combustion chamber 16 over the cylinder hole 5.

In operation, air mixed with fuel, supplied by the carburetor (not shown), is sucked past the reed valve 11 into the crank chamber 9 when the pressure of the crank chamber 9 becomes negative during the up stroke of the piston 6. The air and fuel mixture is then compressed during the down stroke of the piston 6. The compressed mixture is supplied into the combustion chamber 16 via the scavenging passages 14 when the scavenging ports 12 become opened to the combustion chamber 16 due to downward movement of the piston 6. The entrance of the compressed mixture into the combustion chamber 16 causes part of a previously burnt mixture in the combustion chamber 16 to be exhausted into the main exhaust passage 15 via the exhaust port 13. When the scavenging ports 12 and the exhaust port 13 are sequentially blocked by upward movement of the piston 6, the mixture in the combustion chamber 16 is compressed. Next, the mixture is ignited by the ignition plug 17 as the piston 6 nears its top dead center, or in other words, the maximum upwards extent of the piston's movement.

A containing recessed portion 18, which has substantially a fan shape in a side view (see FIG. 2), is formed in an upper portion of the main exhaust passage 15 at a position near the exhaust port 13 in the cylinder block 3. The containing recessed portion 18 is covered with a lid member 20 including a secondary exhaust passage 41 continuous to the downstream side of the main exhaust passage 15 of the cylinder block 3.

An exhaust control valve 21 is disposed in the containing recessed portion 18, As shown in FIGS. 20 to 23, the exhaust control valve 21 is formed substantially in a fan shape in a side view. A rotatably supporting portion 22 is formed at the center of the fan shape of the exhaust control valve 21, and a spline hole 23 is formed in the rotatably supporting portion 22. A bottom wall 24, having a leading edge whose curvature is substantially identical to that of an upper peripheral edge of the cylinder hole 5, is formed on a bottom surface of the exhaust control valve 21. Side walls 25r, 25l are erected upright from each side edge of the bottom wall 24. A control wall 26 having an arcuate surface forming a peripheral surface of the cylinder hole 5 is erected upward from the leading edge of the bottom wall 24. Protrusion portions 27 are formed on each side of the control wall 26, and protrude from the side walls 25r, 25l along the peripheral surface of the cylinder hole 5. A communication hole 28 is provided substantially at the center of the bottom wall 24.

Figure 4:
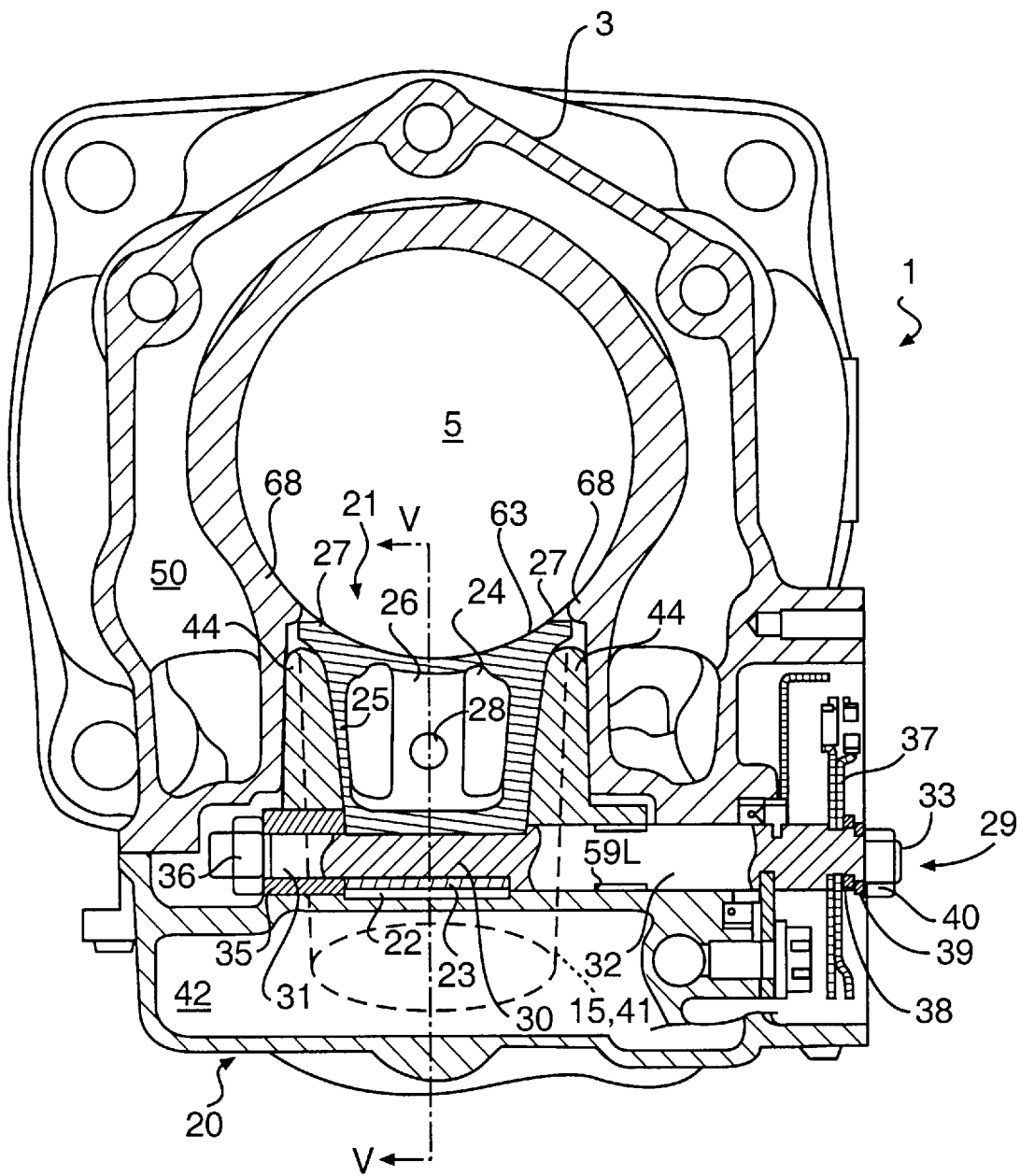
FIG. 4 is a cross-sectional view of FIG. 2 taken along line IV—IV.

As shown in FIG. 4, a spline portion 30 of a valve driving shaft 29 is fitted in the spline hole 23 of the exhaust control valve 21, and a collar 35 is fitted around a small diameter portion 31 positioned near a leading end from the spline portion 30. A nut 36 is screwed onto a leading end of the small diameter portion 31. Thus, the exhaust control valve 21 is connected integrally with the valve driving shaft 29.

A base portion 32 of the valve driving shaft 29 has an outside diameter identical to that of the collar 35, and a pulley 37, a collar 38, and a washer 39 are sequentially fitted around a small diameter portion 33 at a base end of the base portion 32. A nut 40 is screwed with a threaded portion near the base end of the small diameter portion 33.

Figure 11:
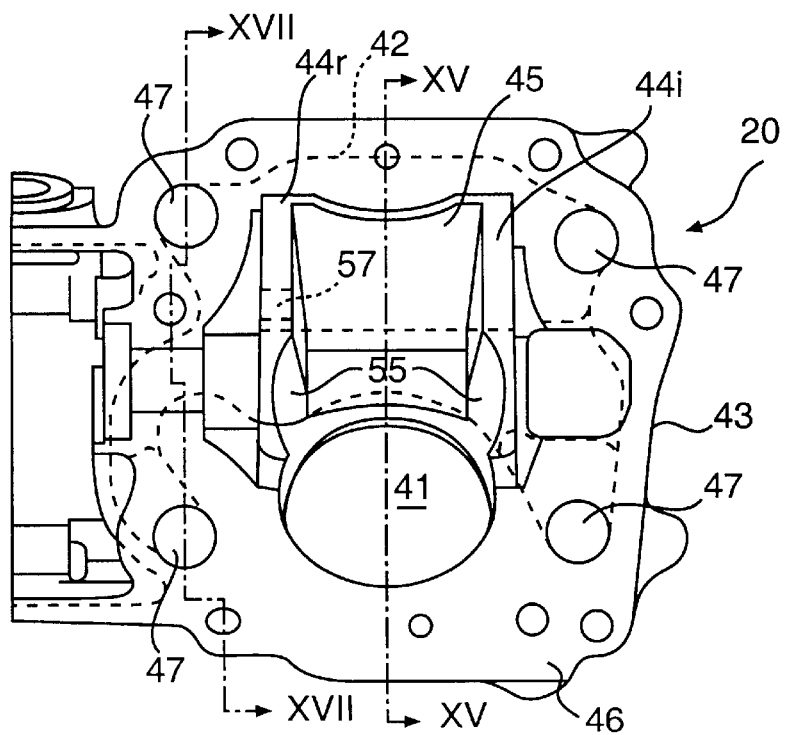
FIG. 11 is a view seen from line XI—XI of FIG. 9.
Figure 15:
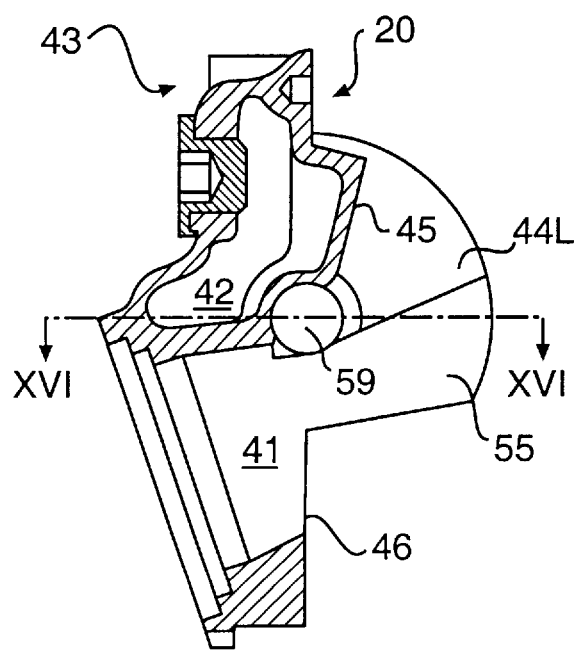
FIG. 15 is a cross-sectional view of FIG. 11 taken along line XV—XV.

As shown in FIGS. 11 and 15, the lid member 20 includes a secondary exhaust passage 41 smoothly connected to a downward portion of the main exhaust passage 15 of the cylinder block 3. The lid member 20 is composed of a lid main body 43 in which a cooling water passage 42 is formed in such a manner as to surround an upper half of the secondary exhaust passage 41, and plate-like exhaust passage forming portions 44r, 44l. Each of the exhaust passage forming portions being formed in a fan shape and being loosely fitted in the containing recessed portion 18 of the cylinder block 3. As shown in FIG. 15, the lid main body 43 has, in an upper space surrounded by the exhaust passage forming portions 44, a fan-shaped projecting partitioning wall 45 having a center angle narrower than those of each exhaust passage forming portions 44r, 44l and each side wall 25, in a side view.

Figure 12:
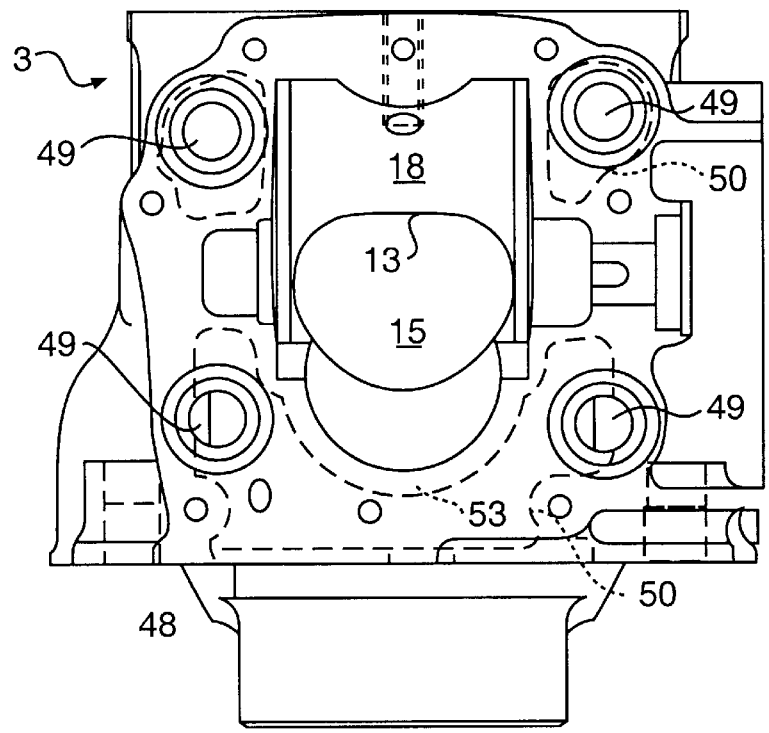
FIG. 12 is a view seen from line XII—XII of FIG. 9.
Figure 13:
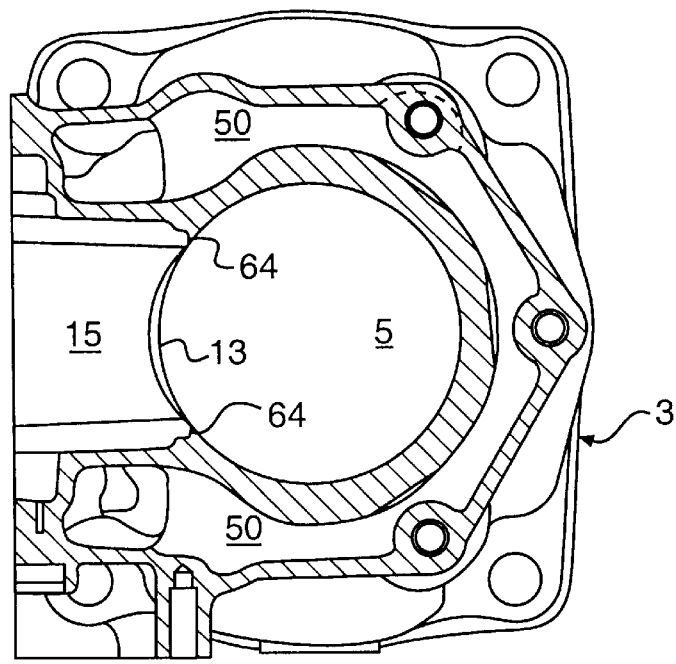
FIG. 13 is a cross-sectional view of FIG. 9 taken along line XIII—XIII.

As shown in FIGS. 11 and 12, the cooling water passage 42 is extended into a backside of the projecting partitioning wall 45. Four cooling water communication ports 47 (upper, lower, right, and left) are formed in a mating surface 46 of the lid main body 43. The four cooling water communication ports communicate to a cooling water passage 50 of the cylinder block 3 via cooling water communication ports 49 formed in a mating surface 48 of the cylinder block 3 (see FIG. 12). A cooling water passage 51 is also formed in the cylinder head 4 and is communicated to the cooling water passage 50 of the cylinder block 3.

Figure 6:
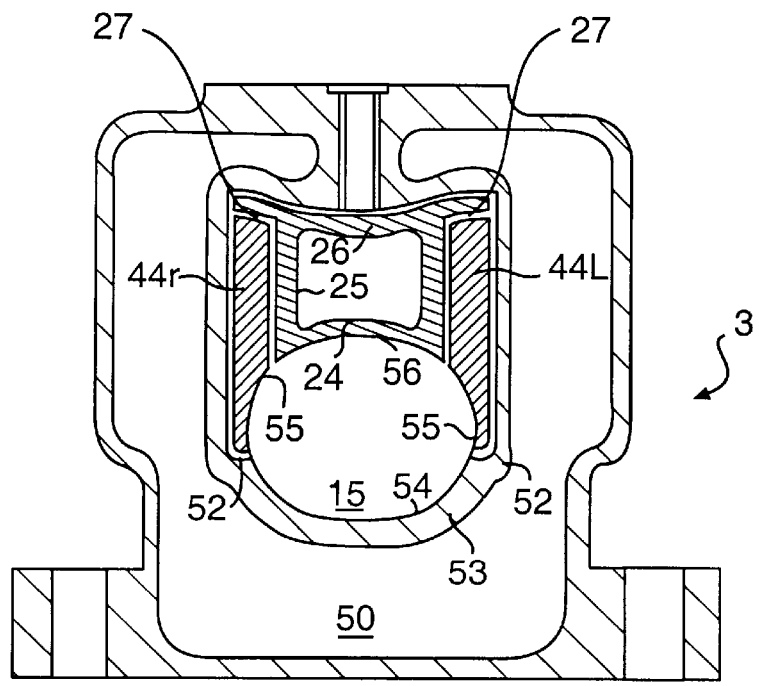
FIG. 6 is a cross-sectional view of FIG. 5 taken along line VI—VI.
Figure 8:
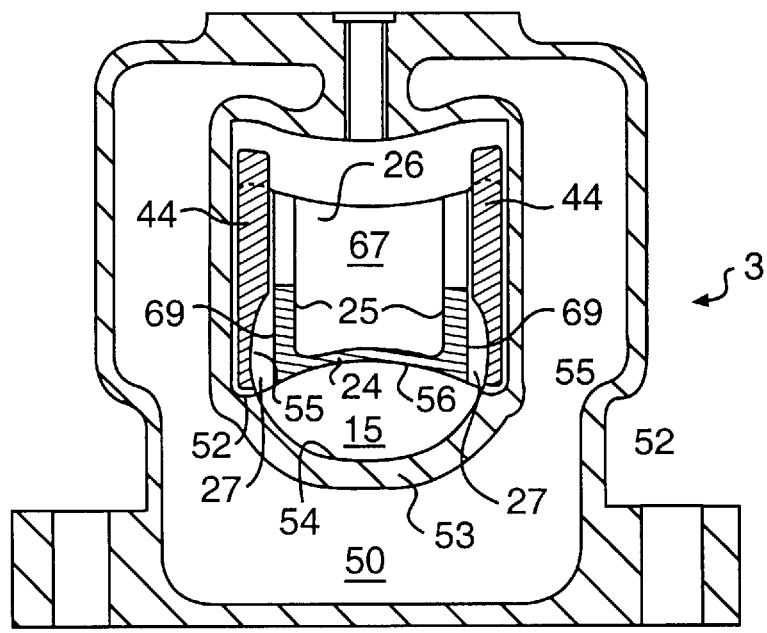
FIG. 8 is a cross-sectional view of FIG. 7 taken along line VII—VII.
Figure 9:
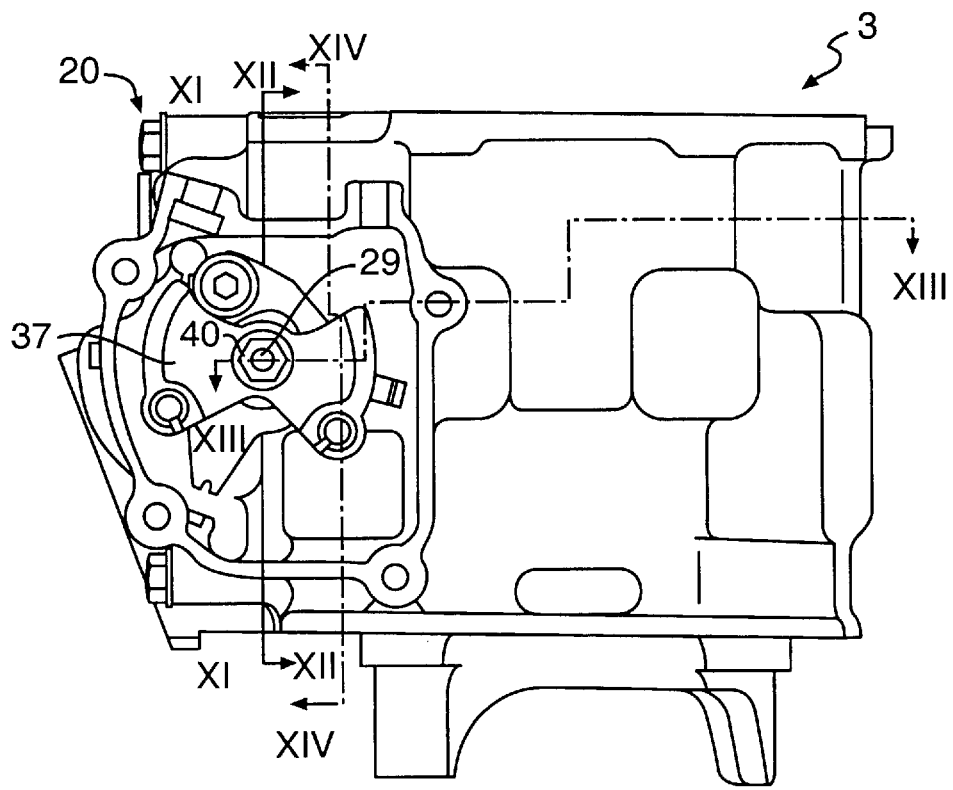
FIG. 9 is a side view of a lid member mounted on a cylinder block.
Figure 10:
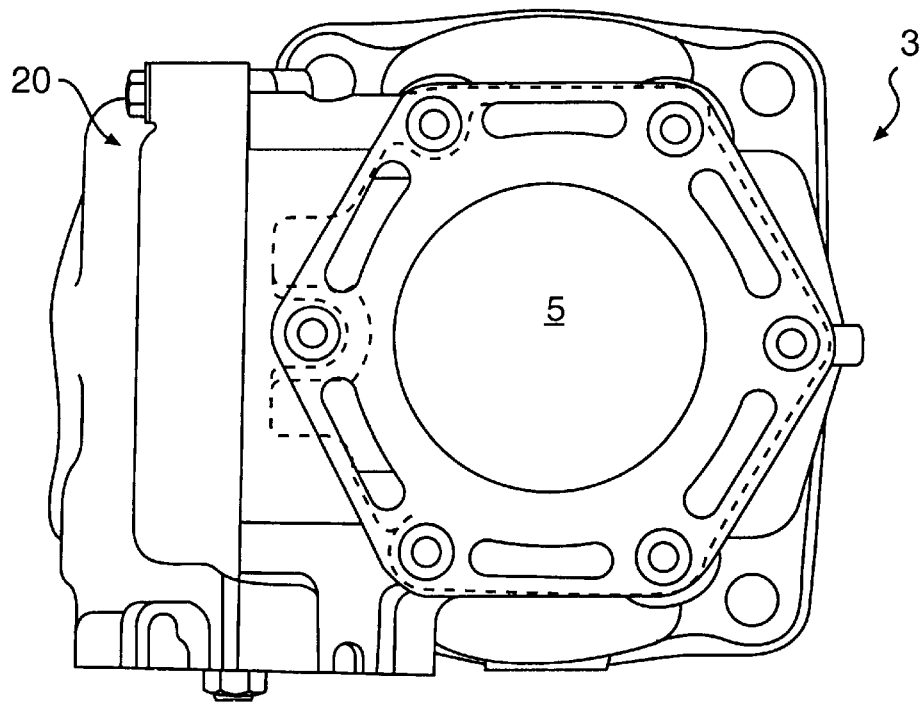
FIG. 10 is a plan view of FIG. 9.
Figure 14:
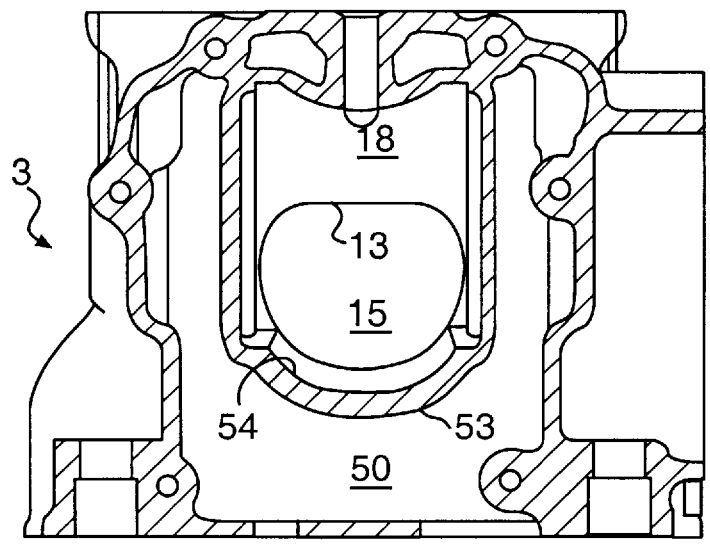
FIG. 14 is a cross-sectional view of FIG. 9 taken along line XIV—XIV.

As shown in FIGS. 6, 8 and 14, the main exhaust passage 15, formed in the cylinder block 3, is surrounded by a passage wall 53. The passage wall 53 has a cross-section of an elliptic shape which extends downward from stepped portions 52. The stepped portions 52 are in contact with lower surfaces of the exhaust passage forming portions 44r, 44l of the lid member 20. Consequently, the main exhaust passage 15 has an elliptic shape with a major axis in a horizontal direction. The main exhaust passage 15 is formed of an inner curving surface 54 of the passage wall 53, inner exhaust passage curving surfaces 55 of the exhaust passage forming portions 44r, 44l, and a lower surface 56 of the bottom wall 24 of the exhaust control valve 21.

Figure 16:
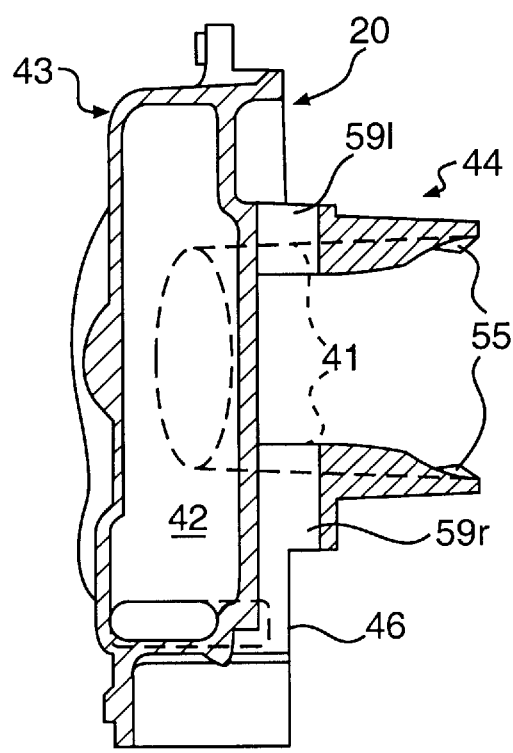
FIG. 16 is a cross-sectional view of FIG. 15 taken along line XVI—XVI.
Figure 17:
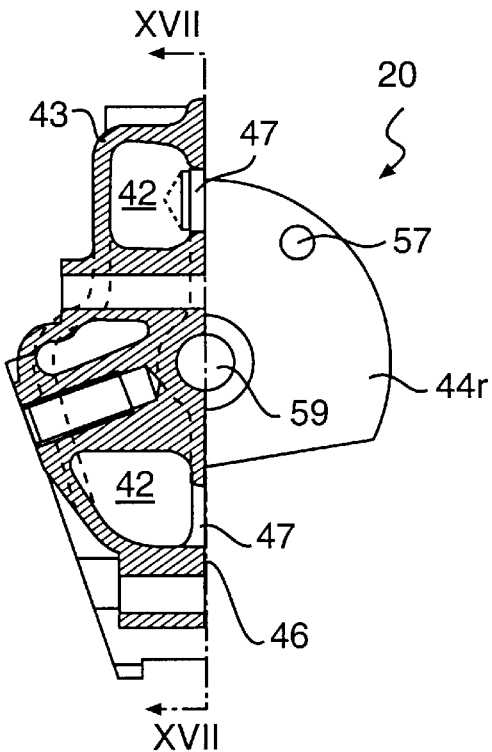
FIG. 17 is a cross-sectional view of FIG. 11 taken along line XVII—XVII.
Figure 18:
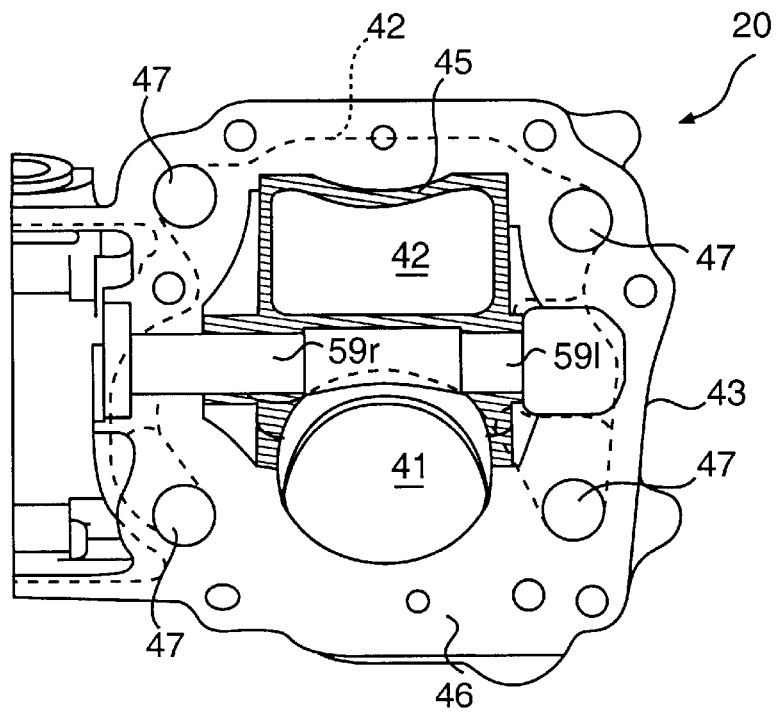
FIG. 18 is a cross-sectional view of FIG. 17 taken along line XVIII—XVIII.
Figure 19:
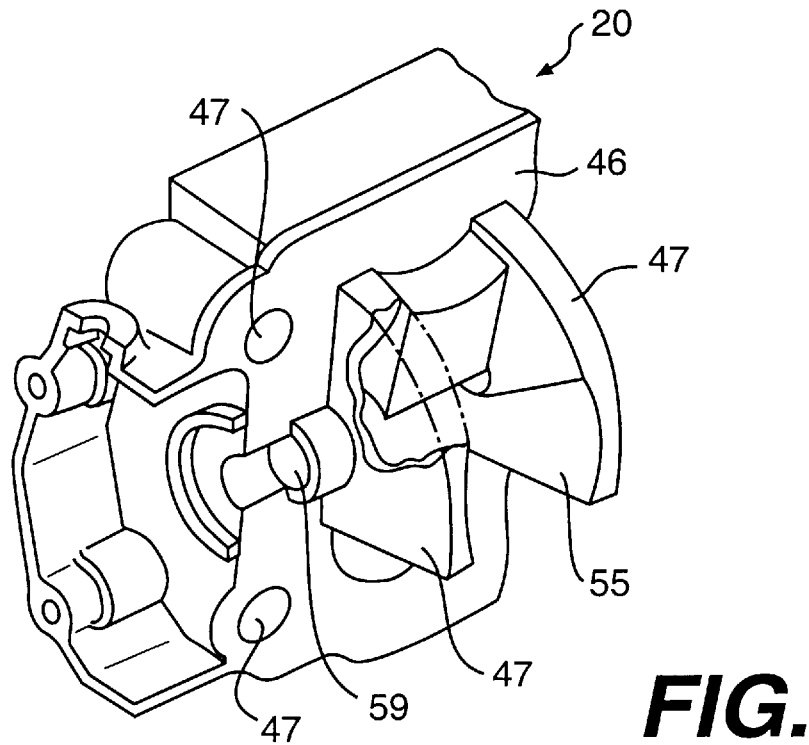
FIG. 19 is a perspective view of a lid member, with parts partially cutaway.
Figure 20:
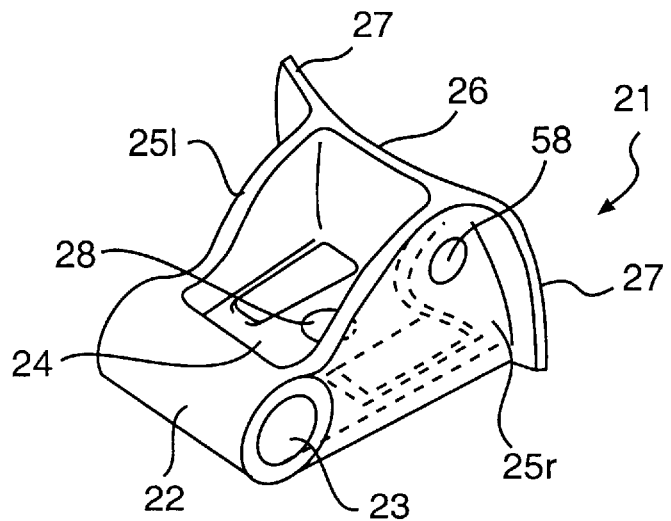
FIG. 20 is a perspective view of an exhaust control valve.
Figure 21:
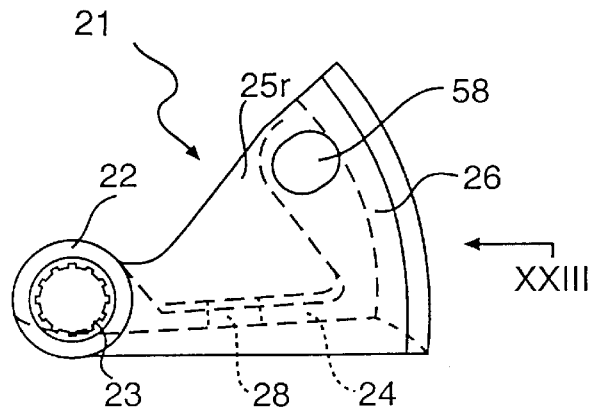
FIG. 21 is a side view of FIG. 20.
Figure 22:
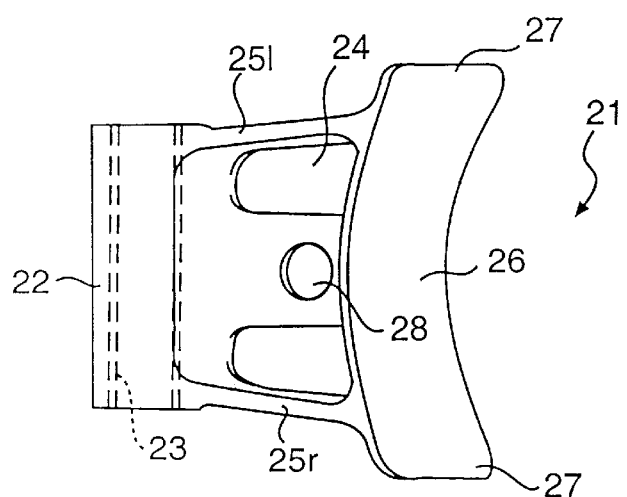
FIG. 22 is a plan view of FIG. 20.
Figure 23:
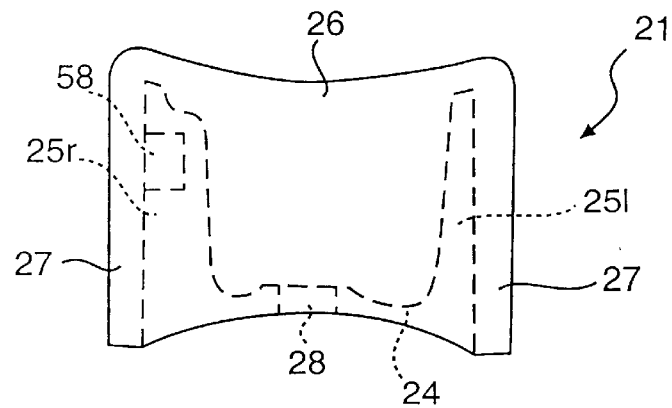
FIG. 23 is a view seen along arrow XXIII of FIG. 21.

Of the pair of the right and left exhaust passage forming portions 44r, 44l, as shown in FIGS. 11 and 17, the right side exhaust passage forming portion 44r has a positioning through-hole 57. As shown in FIGS. 20, 21 and 23, the right side wall 25r of the exhaust control valve 21 has a positioning blind hole 58. Pivotably supporting holes 59r, 59l, for pivotably supporting the valve driving shaft 29, are formed in both the lid main body 43 and the exhaust passage forming portions 44r, 44l of the lid member 20 in such a manner as to be positioned at the center of the fan shape of each of the exhaust passage forming portions 44r, 44l (see FIGS. 15 to 18).

After the collar 35 is fitted in the left pivotably supporting hole 59l, the exhaust control valve 21 is disposed between a pair of the right and left exhaust passage forming portions 44r, 44l and a positioning rod (not shown) is inserted in the positioning through-hole 57 of the exhaust passage forming portion 44r and in the side wall 25r of the exhaust control valve 21 to thus position the exhaust control valve 21. Then, in a state in which the center of the pivotably supporting holes 59r, 59l are aligned with the center of the spline hole 23 of the exhaust control valve 21, the valve driving shaft 29 is inserted from the right pivotally supporting hole 59 into the spline hole 23 and collar 35. Then, the nut 36 is screwed onto the small diameter portion 31 of the valve driving shaft 29, to thereby mount the exhaust control valve 21 on the valve driving shaft 29, in such a manner as to be vertically rockably supported by the exhaust passage forming portions 44 of the lid member 20 via the valve driving shaft 29.

Figure 3:
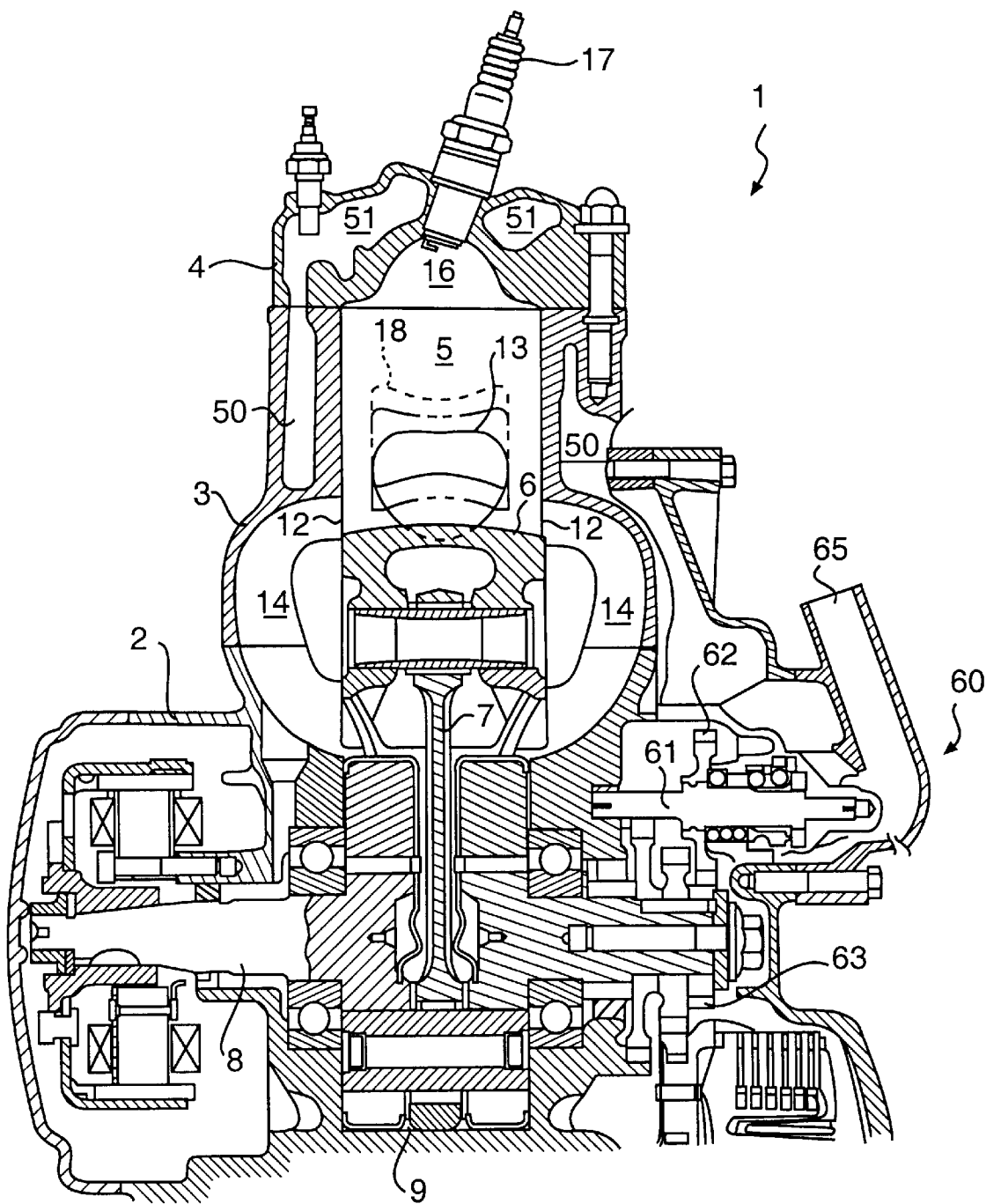
FIG. 3 is a cross-sectional view of FIG. 2 taken along line III—III.

As shown in FIG. 3, a driven gear 62 fitted integrally with a rotating shaft 61 of a cooling water pump 60 meshes with a drive gear 63 integrated with the crank shaft 8. When the crank shaft 8 is rotated, the cooling water pump 60 is rotated. Thus, cooling water, discharged from the cooling water pump 60, flows in the cooling water passage 50 of the cylinder block 3. Part of the cooling water flows in the cooling water passage 42 through the lower ones of the openings 49, 47, being returned into the cooling water passage 50 through the upper ones of the openings 49, 47. The cooling water also flows in the cooling water passage 51 of the cylinder head 4, to thereby cool the cylinder block 3, cylinder head 4 and the lid member 20. In addition, the cooling water discharged from a cooling water discharge port 64 of the cooling water passage 51 of the cylinder head 4 is fed to a radiator (not shown). Water, cooled by the radiator, is then returned into a suction port 65 of the cooling water pump 60.

The pulley 37 (FIG. 4) is connected to a drive pulley of a servo-motor (not shown) via a cable (not shown) under a specific relationship set upon positioning of the exhaust control valve. The rotation of the servo-motor is controlled by a control signal of a CPU which receives input signals regarding a rotational speed of the engine 1, an opening degree of a throttle valve, and an intake pressure. The CPU calculates the rotational speed of the servo-motor on the basis of a specific control map. In a low speed operational state of the engine 1, the exhaust control valve 21 is rocked downward by the servo-motor, and in a high speed operational state of the engine 1, the exhaust control valve 21 is rocked upward by the servo-motor.

Figure 7:
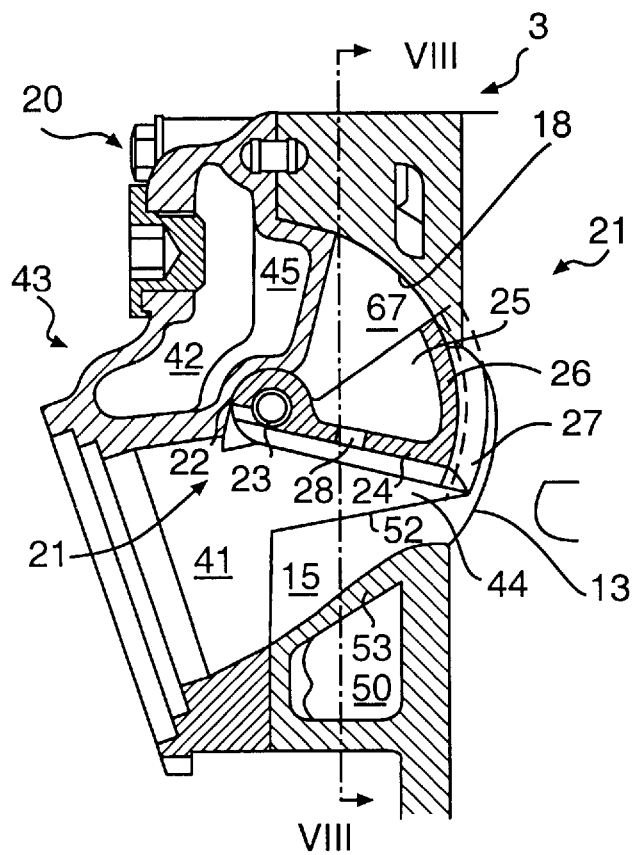
FIG. 7 is a cross-sectional view, similar to FIG. 5, showing a state in which the exhaust control valve is rocked upward.

According to the embodiment having the above configuration, as shown in FIGS. 1 to 23, the exhaust control valve 21 is rocked downward as shown in FIGS. 7 and 8 in a low speed operational state, for example, upon an idling operation, with a result that the starting timing of blocking the exhaust port 13 at the up stroke of the piston 6 is advanced and the starting timing of opening the exhaust port 13 at the down stroke of the piston 6 is retarded. As a result, the compression ratio is increased and the volume of a space portion 67 surrounded by the containing recessed portion 18 and the exhaust control valve 21 is enlarged.

In such a low speed operational state, the exhaust system volume is increased. The exhaust system would include the space portion 67 communicated via the communication hole 28 to the main exhaust passage 15, downstream exhaust passage 41 and an exhaust pipe (not shown). The length of the exhaust system is extended, so that a positive pressure reflection wave of the exhaust gas in the low speed operational state reaches the exhaust port 13 in a proper timing corresponding to completion of blocking of the exhaust port 13. As a result, the blowoff of unburnt gas from the exhaust port 13 into the exhaust passage 15 and the downstream exhaust passage 41 can be prevented. Also, the exhaust of the new gas is controlled, to thereby improve the charging efficiency in a low speed operational state, thus increasing the output and improving the fuel consumption.

Further, in a state in which the exhaust control valve 21 is descended to the lower limit, a large amount of the burnt gas remains in the combustion chamber 16. The combustion chamber 16 is kept at a high temperature. Also, an actively thermal atmospheric combustion is performed near the top dead center by the increased compression ratio, thereby avoiding any significant reduction in output and preventing the amount of unburnt hydrocarbon in the exhaust gas from being increased.

Figure 5:
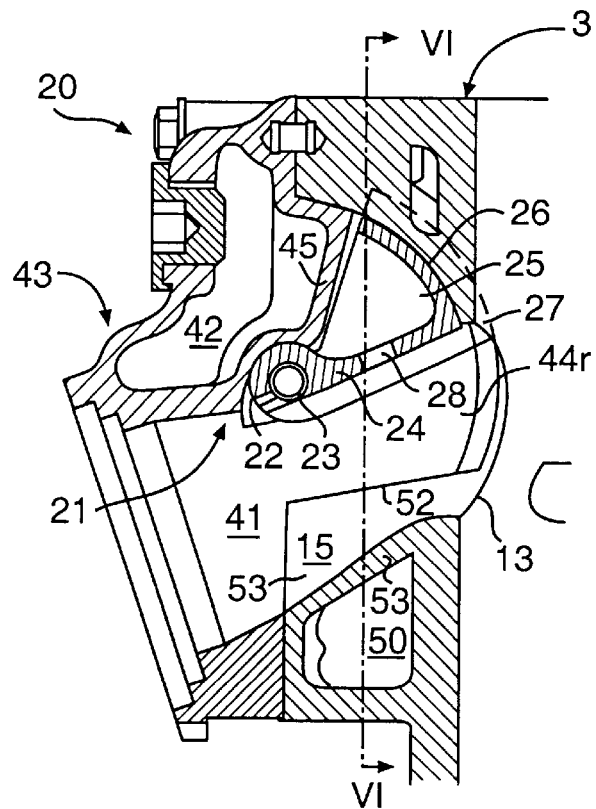
FIG. 5 is a cross-sectional view of FIG. 4 taken along line V—V.

As the crank shaft 8 is accelerated from a low speed operational state, the control exhaust valve 21 is rocked upward as shown in FIGS. 5 and 6. In this state, the starting timing of blocking the exhaust port 13 at the up stroke of the piston 6 is retarded while the starting timing of opening the exhaust port 13 at the down stroke of the piston 6 is advanced. Also, the volume of the space portion 67 is reduced. Accordingly, it is possible to smoothly perform gas exchange in a large amount and hence to achieve an exhaust pressure pulsation effect. Further, since the positive pressure reflection wave of the exhaust gas in a high speed operational state reaches the exhaust port 13 in a proper timing corresponding to completion of blocking the exhaust port 13, it is possible to suppress the discharge of the new gas from the exhaust port 13 by the positive pressure reflection wave, and hence to increase the output while keeping a desirable fuel consumption.

The volume of the space portion 67 is continuously changed depending on the degree of vertical rocking of the exhaust control valve 21. Correspondingly, the substantial length of the exhaust system is continuously changed, so that a high exhaust pulsation effect can be obtained in a wide range from a low speed operational region to a high speed operational region. Related spark ignition type, two stroke internal combustion engines could only vary the substantial length of the exhaust system between large and small values.

In the lid member 20, including the downstream exhaust passage 41, the outer periphery of the downstream exhaust passage 41 is surrounded by the cooling water passage 42, so that the outer peripheral wall of the downstream exhaust passage 41 can be sufficiently cooled. Also, the lid member 20 is substantially uniformly cooled to thereby prevent any occurrence of a large thermal strain in the lid member 20.

As shown in FIGS. 5 and 6, in a state in which the exhaust control valve 21 is rocked upward and the exhaust port 13 is full-opened, the lower half of the exhaust gas discharged from the exhaust port 13 of the cylinder block 3 flows along the exhaust passage 15 of the cylinder block 3. As shown in FIG. 6, the upper half of the exhaust gas flows along the inner exhaust passage curving surfaces 55 which are formed in a shape smoothly connected to the inner curving surface 54 of the exhaust passage 15 and along the lower surface of the bottom wall 24 of the exhaust control valve 21. Thus, the lower half and the upper half of the exhaust gas are smoothly collected in the downstream exhaust passage 41 without large disturbance, to thereby smoothly carry out the gas exchange in the combustion chamber 16.

Further, as shown in FIGS. 7 and 8, in a state in which the exhaust control valve 21 is rocked downward and the exhaust port 13 is restricted, the protrusion portions 27 protruded from both the sides of the control wall 26 of the exhaust control valve 21 are brought in close-contact with the leading end surfaces of the exhaust passage forming portions 44 to cover from the front side the inner exhaust passage curving surfaces 55 of the exhaust passage forming portions 44 and the lower surface 56 of the bottom wall 24 of the exhaust control valve 21 is opposed to the inner curving surface 54 of the passage wall 53 of the exhaust passage 15, to form the upper surface of the flow passage, so that the exhaust gas smoothly flows down into the downward exhaust passage 41 without large disturbance, to thereby smoothly carry out the gas exchange in a low speed rotational state.

When the exhaust control valve 21 is rocked downward and the exhaust port 13 is restricted, the upper edge of the piston 6 is positioned between the upper edge of the exhaust port 13 and the lower surface of the bottom wall 24 of the exhaust control valve 21, and in such a state, as shown in FIG. 8, a burnt gas in the cylinder hole 5 is prevented from flowing in gaps between the inner exhaust passage curving surfaces 55 of the exhaust passage forming portions 44 and the outer surfaces 59 of the side walls 25 of the exhaust control valve 21 by the protrusion portions 27 protruding to both the sides of the control wall 26 of the exhaust control valve 21 and projecting portions 68 projecting in the center direction from the edges of the protrusion portions 27 on both the sides of the exhaust port 13 of the cylinder block 3 (see FIG. 4), to prevent the leakage of the burnt gas from the cylinder hole 5 into the downstream exhaust passage 41, thereby increasing the scavenging effect and the charging effect. This makes it possible to improve the output and efficiency of the spark ignition type two stroke internal combustion engine 1.

Further, as shown in FIG. 4, since the exhaust passage forming portions 44 are provided on the lid member 20, the exhaust control valve 21 having the protrusion portions 27 can be inserted in the exhaust passage 15 without interference by the projecting portions 68 in the exhaust port 13 of the cylinder block 3.

Figure 24:
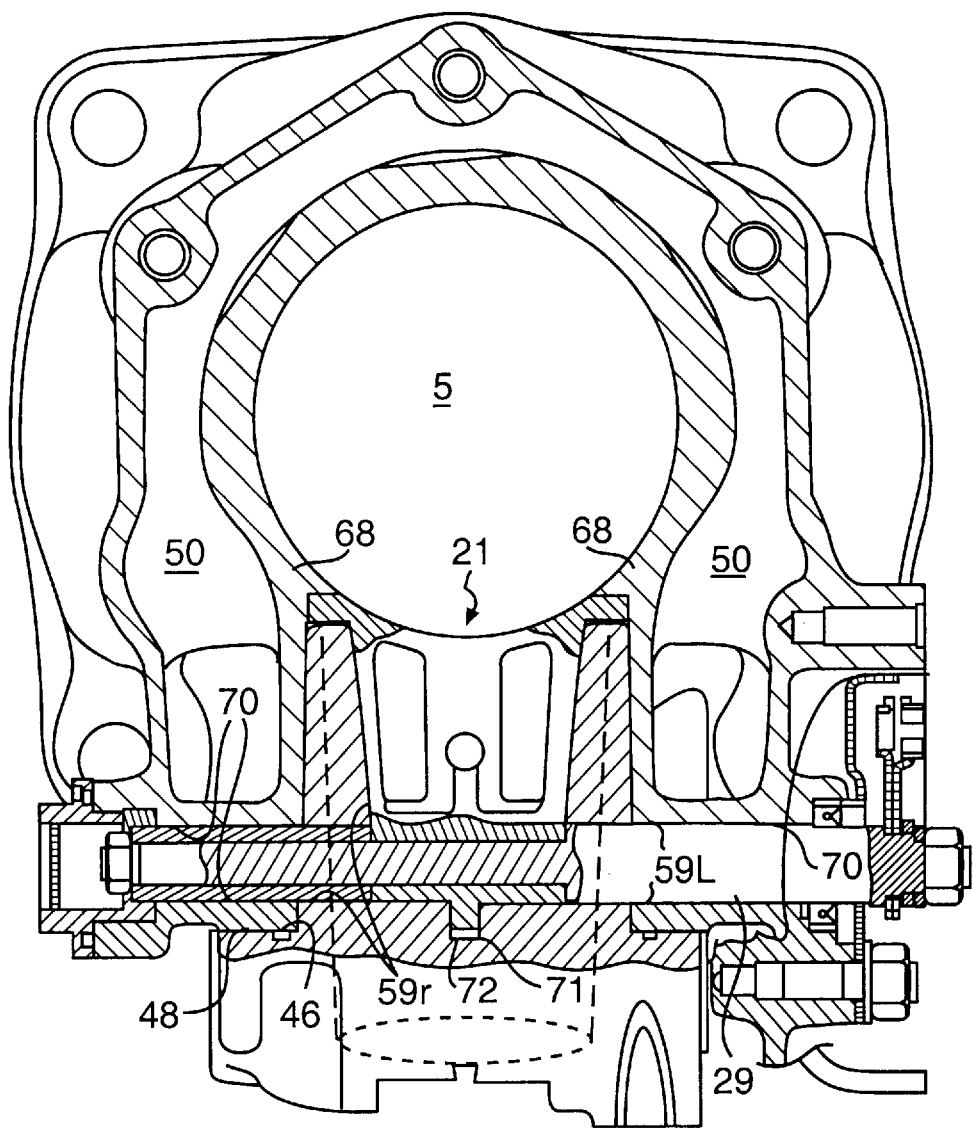
FIG. 24 is a cross-sectional view, similar to FIG. 4, showing another embodiment.
Figure 25:
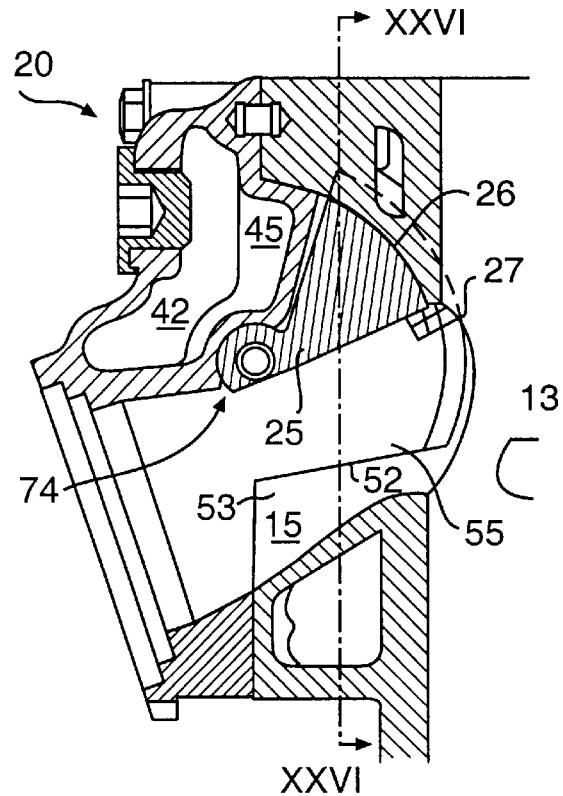
FIG. 25 is a cross-sectional view, similar to FIG. 5, showing a further embodiment.
Figure 26:
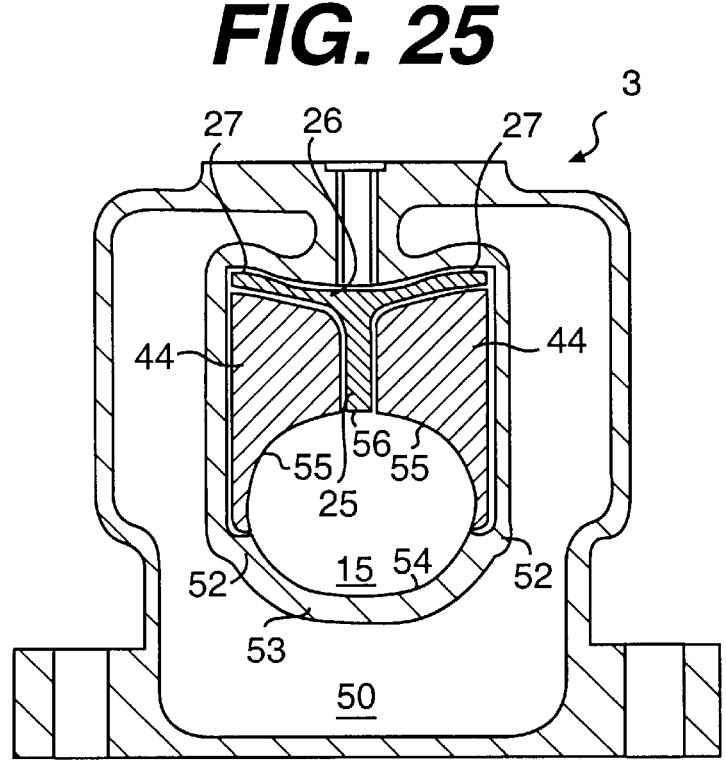
FIG. 26 is a cross-sectional view of FIG. 25 taken along line XXVI—XXVI.
Figure 27:
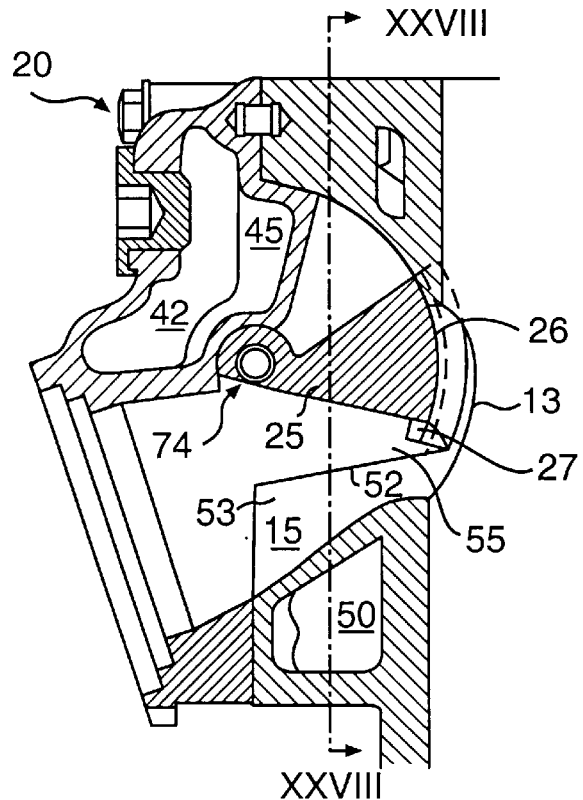
FIG. 27 is a cross-sectional view, similar to FIG. 25, showing a state in which the exhaust control valve is closed.
Figure 28:
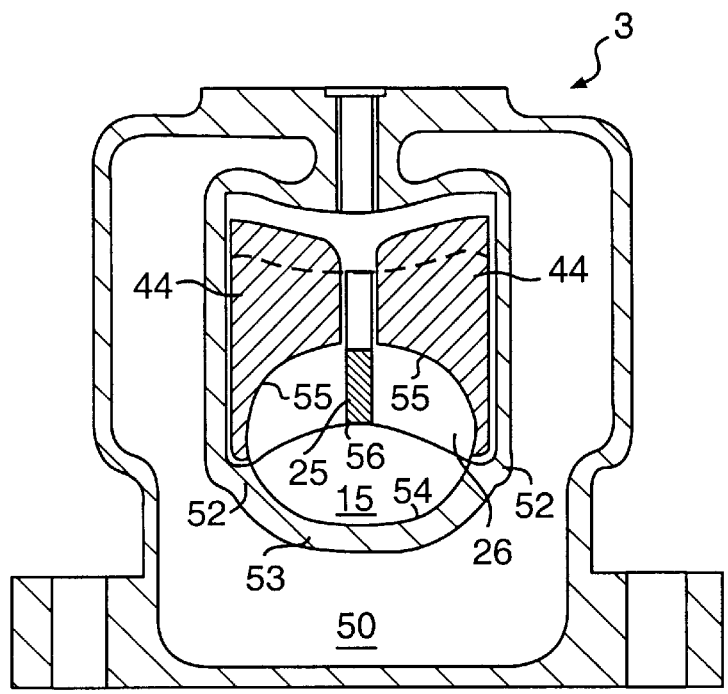
FIG. 28 is a cross-sectional view of FIG. 27 taken along line XXVIII—XXVIII.
Figure 29:
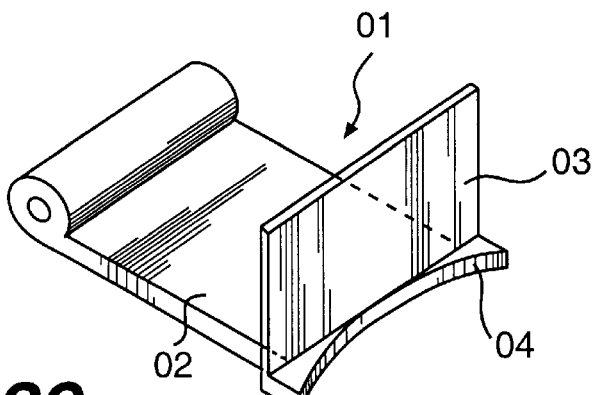
FIG. 29 is a perspective view of a exhaust control valve according to the prior art.
Figure 30:
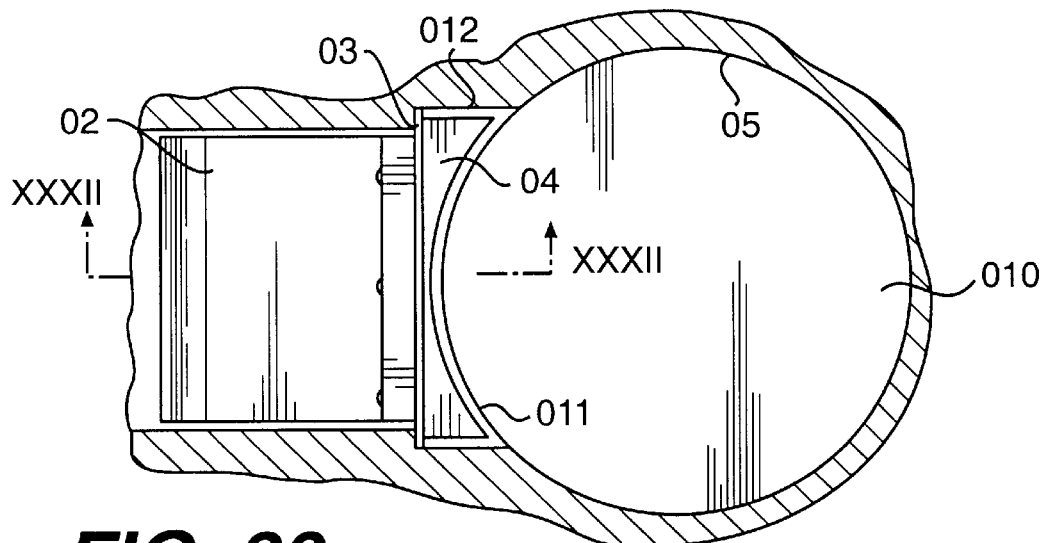
FIG. 30 is a plan view of FIG. 29.
Figure 31:
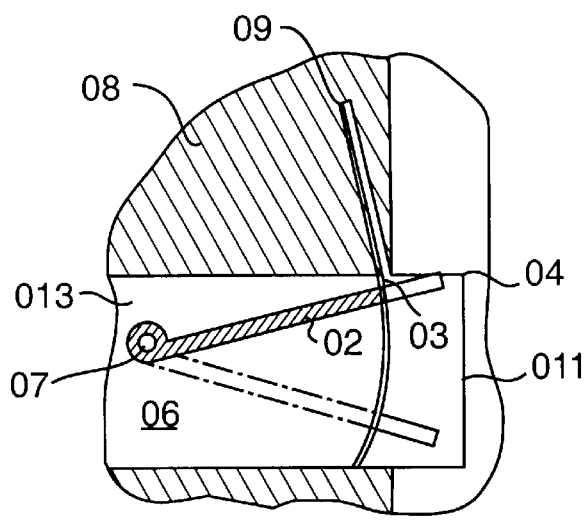
FIG. 31 is a cross-sectional view of FIG. 30 taken along line XXXII—XXXII.

In the embodiment shown in FIGS. 1 to 23, the mating face of the lid member 20, as shown in FIG. 16, is a half face passing through the center of the pivotably supporting holes 59 and the valve driving shaft 29 is pivotably supported only by the pivotably supporting holes 59 formed in the exhaust passage forming portions of the lid member 20. However, as shown in FIG. 24, the mating face 48 of the cylinder block 3 and the mating face 46 of the lid member 20 may be shifted outward of the cylinder block 3 from the center of the valve driving shaft 29, so that the valve driving shaft 29 can be rockably supported by the pivotably supporting holes 59 of the lid member 20 in co-operation with a pivotably supporting hole 70 of the cylinder block 3.

In this case, in order to specify a positional relationship between the side walls 25 of the exhaust control valve 21 and the exhaust passage forming portions 44 of the lid member 20, a flange portion 71 is formed on the rotatably supporting portion 22 of the exhaust control valve 21 and a peripheral cutout 72 is formed in the lid member 20.

Further, in the embodiment shown in FIGS. 1 to 24, the exhaust control valve 21 includes the two side walls 25 and has a recessed portion formed by the rotatably supporting portion 22, bottom wall 24, side walls 25, and control wall 26. However, as shown in FIGS. 25 to 28, both the side walls 25 may be integrated with each other at the center in the width direction to be formed in a T-shape in a plan view, and further, the exhaust control valve 74 may be formed in a further simplified shape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An exhaust controller for an engine having a cylinder hole, an exhaust port communicating with the cylinder hole, and an exhaust passage leading away from the exhaust port, said exhaust controller comprising:

an exhaust control valve mounted in the exhaust passage adjacent the exhaust port, and capable of reciprocating movement relative to the exhaust port, which movement results in varying degrees of blockage of the exhaust port's communication with the cylinder hole;

wherein said exhaust control valve includes:

a bottom surface having a lead edge, a first side edge, a second side edge, and a back edge;

said lead edge being located nearer to the cylinder hole than said back edge; and a control surface, integrally formed with said lead edge, said control surface extending away from said lead edge, said control surface having a first side facing the cylinder hole, said first side having a curved shape with a radius of curvature substantially equal to a constant radius of curvature of the cylinder hole, said control surface including first protrusion and a second protrusion, said first protrusion being formed radially beyond said first side edge of said bottom surface, and said second protrusion being formed radially beyond said second side edge of said bottom surface, said first and second protrusions being side extensions of said control surface which extend along the constant radius of curvature of the cylinder hole.

2. The exhaust controller of claim 1, wherein a side of said lead edge of said bottom surface, opposite to another side of said lead edge from which said control surface extends, has a partial elliptical shape.

3. The exhaust controller of claim 1, wherein said exhaust control valve further includes:

a first side portion and a second side portion, said first side portion connecting said first side edge of said bottom surface to a second side of said control surface, opposite said first side of said control surface, and said second side portion connecting said second side edge of said bottom surface to said second side of said control surface.

4. The exhaust controller of claim 3, wherein said first protrusion is formed between the connection of said first side portion to said second side of said control surface and a first edge of said control surface, and said second protrusion is formed between the connection of said second side portion to said second side of said control surface and a second edge of said control surface.

5. The exhaust controller of claim 1, wherein the exhaust port and the exhaust passage both have an elliptic cross-sectional shape.

6. The exhaust controller of claim 5, wherein a side of said lead edge of said bottom surface, opposite to another side of said lead edge from which said control surface extends, has a partial elliptical shape.

7. The exhaust controller of claim 1, wherein said back edge of said bottom surface of said exhaust control valve is pivotally attached to a shaft located adjacent to a wall defining the exhaust passage.

8. The exhaust controller of claim 7, wherein said exhaust control valve further includes:

a first side portion and a second side portion, said first side portion connecting said first side edge of said bottom surface to a second side of said control surface, opposite said first side of said control surface, and said second side portion connecting said second side edge of said bottom surface to said second side of said control surface.

9. The exhaust controller of claim 8, wherein said first protrusion is formed between the connection of said first side portion to said second side of said control surface and a first edge of said control surface, and said second protrusion is formed between the connection of said second side portion to said second side of said control surface and a second edge of said control surface.

10. An engine comprising:

a cylinder hole;

an exhaust port communicating with said cylinder hole;

an exhaust passage leading away from said exhaust port; and an exhaust control valve mounted in said exhaust passage adjacent said exhaust port, and capable of reciprocating movement relative to said exhaust port, which movement results in varying degrees of blockage of said exhaust port's communication with said cylinder hole;

wherein said exhaust control valve includes:

a bottom surface having a lead edge, a first side edge, a second side edge, and a back edge;

said lead edge being located nearer to said cylinder hole than said back edge; and a control surface, integrally formed with said lead edge, said control surface extending away from said lead edge, said control surface having a first side facing said cylinder hole, said first side having a curved shape with a radius of curvature substantially equal to a constant radius of curvature of said cylinder hole, said control surface including a first protrusion and a second protrusion, said first protrusion being formed radially beyond said first side edge of said bottom surface, and said second protrusion being formed radially beyond said second side edge of said bottom surface, said first and second protrusions being side extensions of said control surface which extend along the constant radius of curvature of the cylinder hole.

11. The engine of claim 10, wherein said back edge of said bottom surface of said exhaust control valve is pivotally attached to a shaft located adjacent to a wall defining said exhaust passage.

12. The engine of claim 10, wherein a side of said lead edge of said bottom surface, opposite to another side of said lead edge from which said control surface extends, has a partial elliptical shape.

13. The engine of claim 10, wherein said exhaust port and said exhaust passage both have an elliptic cross-sectional shape.

14. The engine of claim 13, wherein a side of said lead edge of said bottom surface, opposite to another side of said lead edge from which said control surface extends, has a partial elliptical shape.

15. The engine of claim 10, wherein said exhaust control valve further includes:
   a first side portion and a second side portion, said first side portion connecting said first side edge of said bottom surface to a second side of said control surface, opposite said first side of said control surface, and said second side portion connecting said second side edge of said bottom surface to said second side of said control surface.

16. The engine of claim 15, wherein said first protrusion is formed between the connection of said first side portion to said second side of said control surface and a first edge of said control surface, and said second protrusion is formed between the connection of said second side position to said second side of said control surface and a second edge of said control surface.

17. The engine of claim 11, wherein said exhaust control valve further includes:
   a first side portion and a second side portion, said first side portion connecting said first side edge of said bottom surface to a second side of said control surface, opposite said first side of said control surface, and said second side portion connecting said second side edge of said bottom surface to said second side of said control surface.

18. The engine of claim 17, wherein said first protrusion is formed between the connection of said first side portion to said second side of said control surface and a first edge of said control surface, and said second protrusion is formed between the connection of said second side portion to said second side of said control surface and a second edge of said control surface.

* * * * *